US008469388B2

(12) United States Patent
Moore

(10) Patent No.: US 8,469,388 B2
(45) Date of Patent: *Jun. 25, 2013

(54) DETACHABLE TRAY ACCESSORY FOR STROLLER

(75) Inventor: Lauren A. Moore, San Diego, CA (US)

(73) Assignee: Tray Vous LLC, San Diego, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 13/107,974

(22) Filed: May 16, 2011

(65) Prior Publication Data

US 2011/0210531 A1 Sep. 1, 2011

Related U.S. Application Data

(63) Continuation-in-part of application No. 12/284,764, filed on Sep. 25, 2008, now Pat. No. 7,942,437.

(51) Int. Cl.
*B62B 1/00* (2006.01)

(52) U.S. Cl.
USPC .......................................... 280/642; 280/650

(58) Field of Classification Search
USPC ............... 280/642, 650, 656, 658, 644, 647, 280/47.38, 47.18; 297/174 R, 188.18, 188.2; 403/322.4, 327, 330
See application file for complete search history.

(56) References Cited

U.S. PATENT DOCUMENTS

| 5,964,501 A * | 10/1999 | Magnani ................... 297/174 R |
| 6,478,503 B1 * | 11/2002 | Cheng ......................... 403/322.4 |
| 6,698,773 B2 * | 3/2004 | Hsia ............................ 280/47.38 |
| 7,273,224 B2 * | 9/2007 | Wang .............................. 280/647 |
| 7,281,732 B2 * | 10/2007 | Fox et al. ....................... 280/642 |
| 7,413,213 B2 * | 8/2008 | Pike et al. ...................... 280/642 |
| 7,694,995 B2 * | 4/2010 | Dotsey et al. ................. 280/642 |
| 7,717,456 B2 * | 5/2010 | Chen et al. ..................... 280/642 |
| 7,942,437 B2 * | 5/2011 | Moore ........................... 280/642 |
| 2005/0242549 A1 * | 11/2005 | Longenecker et al. ....... 280/642 |
| 2009/0127828 A1 * | 5/2009 | Longenecker et al. ....... 280/650 |

* cited by examiner

*Primary Examiner* — Hau Phan
(74) *Attorney, Agent, or Firm* — Clause Eight IPS; Michael Catania

(57) ABSTRACT

A detachable tray accessory for a stroller secured by a left and right side member or lock housing member each containing a detachable attaching means that attaches to and releases from a corresponding lock receiver on the stroller assembly or stroller seat. The detachable tray accessory of the present invention preferably includes a support bar for supporting the shape and weight of a flat surface tray removably attachable to the support bar. Alternatively, the detachable tray accessory is utilized with a removable carry handle of the stroller.

12 Claims, 8 Drawing Sheets

DETAIL C

DETACHABLE TRAY ACCESSORY FOR STROLLER

CROSS REFERENCE TO RELATED APPLICATION

The present application is a continuation-in-part application of U.S. patent application Ser. No. 12/284,764, filed on Sep. 25, 2008, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention relates generally to a stroller tray, and particularly to a detachable tray accessory for a stroller seat secured by a left and right lock housing member with a lock button that inserts into and releases from an existing corresponding lock receiver on the stroller.

2. Description of the Related Art

It can be appreciated that strollers having stroller trays have been in use for years. Typically, strollers with trays include trays that are permanently attached to the stroller. There are also many conventional strollers that do not provide a tray accessory at all. The main problem with conventional strollers without a tray accessory is that they do not provide for the convenience of feeding surface or play for the child. A problem with permanently attached stroller trays is that they do not allow for the removal of the tray, enabling a child's enhanced mobility or use of another accessory, such as a handle, in place of the tray.

While there has been a trend to provide versatile strollers with accessories for the child and the child's caretaker, further improvements in the effectiveness and interchangeability of the accessories are desirable, and the truss detachable tray accessory for stroller of the present invention addresses the existing problems and provides related solutions and benefits.

BRIEF SUMMARY OF THE INVENTION

The present invention provides a new detachable tray accessory for a stroller, which is secured by a left and a right detachable means that insert removably attach and releases from a corresponding lock receiver located on the stroller assembly, including stroller frame and/or stroller support members, or stroller seat.

The present invention recognizes that providing a detachable tray accessory for a stroller which can be built in different configurations and able to be used with a various strollers can enhance the comfort of the child riding in the stroller, provide a surface for feeding and play, and make removal of the tray to be exchanged with other accessories easier for the caretaker of the child. The present invention can be built and/or adapted to be used in connection with any stroller that include detachable receiving means for accessories such as a stroller handle or guard or a stroller seat guard or handle. The present invention is particularly adaptable to be used in connection with strollers manufactured by Royalty Bugaboo, S.A.R.L (Luxembourg), including the CHAMELEON or the FROG stroller models.

One aspect of the present invention includes a detachable tray accessory for a stroller, including a substantially crescent-shaped support bar including detachable means, the support bar being removably attachable to a stroller seat having means for receiving accessories; and a substantially flat tray attached to the support bar.

Another aspect of the present invention includes a tray accessory for a stroller, including a substantially crescent-shaped support bar including a left and a right side members which angle downward from the plane of the crescent-shaped support bar, the left and the right side members each including a spring loaded detachable lock button for removably attaching the support bar to a stroller seat having means for receiving accessories having means for receiving accessories, the left and the right side members having a length that provides for sufficient space between a child seated in the stroller seat and the support bar; and a substantially flat tray including raised rounded edges, the tray being removably attached to the support bar by way of the raised rounded edges.

Another aspect of the present invention is a detachable tray accessory for a stroller having a removable carry handle having a rounded extension bar having a first end and a second end. The first end has a locking button and the second end has a locking button. The stroller has a first receptor and a second receptor. The detachable tray accessory preferably comprises a first side connector member, a second side connector member and a substantially flat tray. The first side connector member is removably attached at a handle end to the first end of the carry handle through use of the locking button of the first end of the carry handle. A stroller end is at an angle of at least forty-five degrees from a plane of the handle end and the stroller end comprises a locking button for removable attachment to the first receptor of the stroller. The first receptor receives the stroller end of the first side connector member. The second side connector member is removably attached at a handle end to the second end of the carry handle through use of the locking button of the second end of the carry handle. A stroller end is at an angle of at least forty-five degrees from a plane of the handle end and the stroller end comprises a locking button for removable attachment to the second receptor of the stroller. The second receptor receives the stroller end of the second side connector member. The substantially flat tray comprises a curved peripheral raised rounded edge region for covering and attachment to the rounded extension bar of the carry handle.

Yet another aspect of the present invention is a detachable tray accessory for a stroller. The detachable tray accessory comprises a support bar, a first side connector member, a second side connector member and a substantially flat tray. The support bar comprises a rounded extension bar having a first end and a second end, the first end having a locking button and the second end having a locking button. The first side connector member is removably attached at a bar end to the first end of the support bar and has a stroller end at a downward angle from a plane of the support bar. The stroller end comprises a locking button for removable attachment to a stroller having a first receptor for receiving the stroller end of the first side connector member. The second side connector member is removably attached at a bar end to the first end of the support bar and having a stroller end at a downward angle from a plane of the support bar. The stroller end comprises a locking button for removable attachment to a stroller having a second receptor for receiving the stroller end of the second side connector member. The substantially flat tray comprises a curved peripheral raised rounded edge region for covering and attachment to the rounded extension bar of the support bar.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

Various other objects, features and attendant advantages of the present invention will become fully appreciated as the same becomes better understood when considered in conjunction with the accompanying drawings, in which like reference characters designate the same or similar parts throughout the several views.

DETAILED DESCRIPTION OF THE INVENTION

Figure 1:
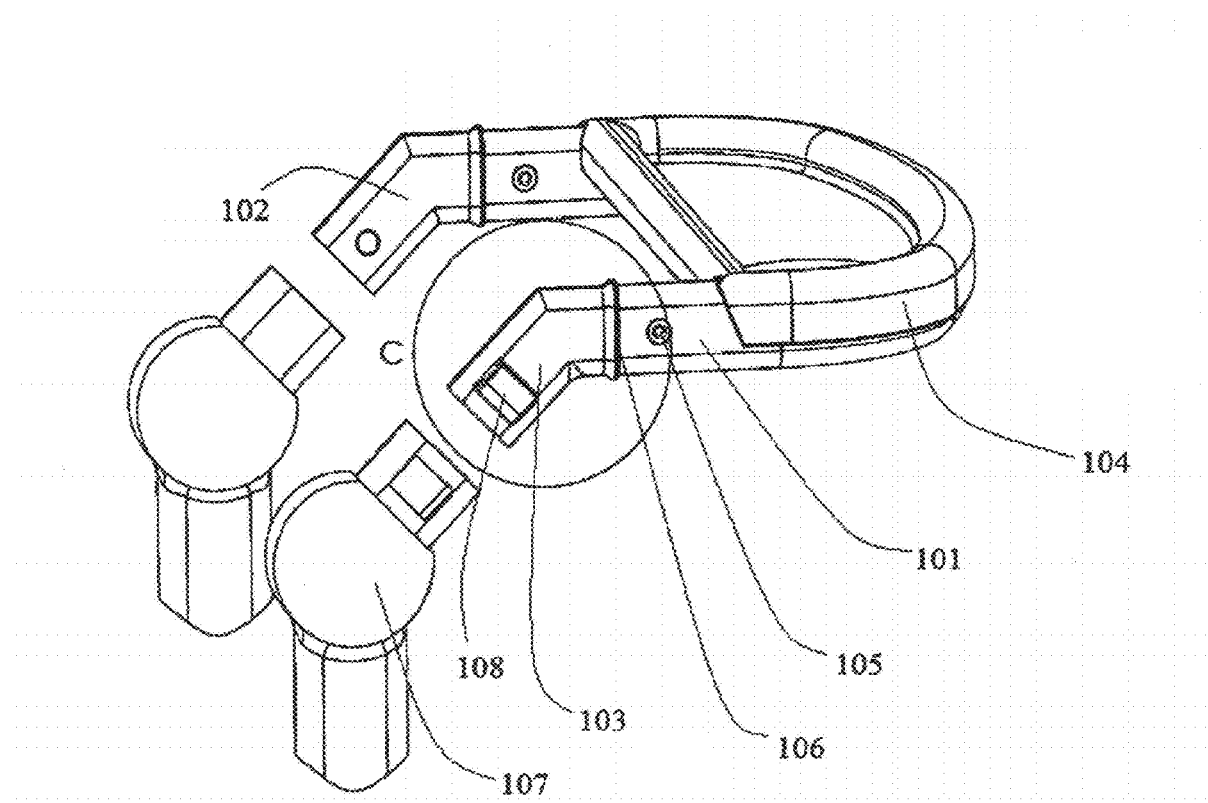
FIG. 1 shows a perspective view of a preferred embodiment of a detachable tray accessory with angled lock housing.
Figure 2:
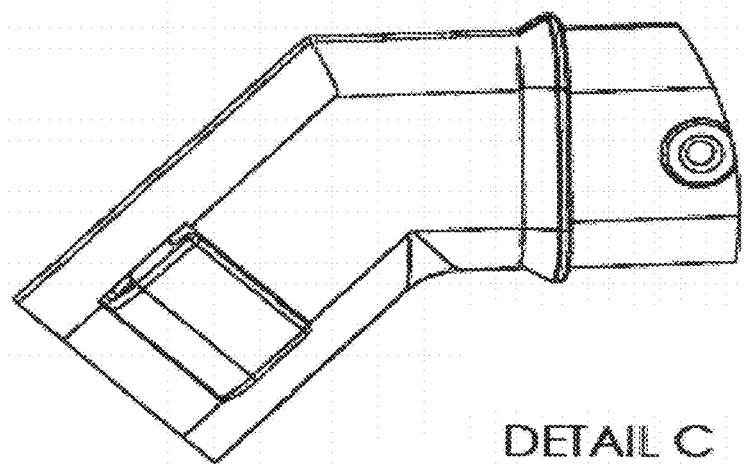
FIG. 2 shows a perspective view of an embodiment of the lock housing.
Figure 3:
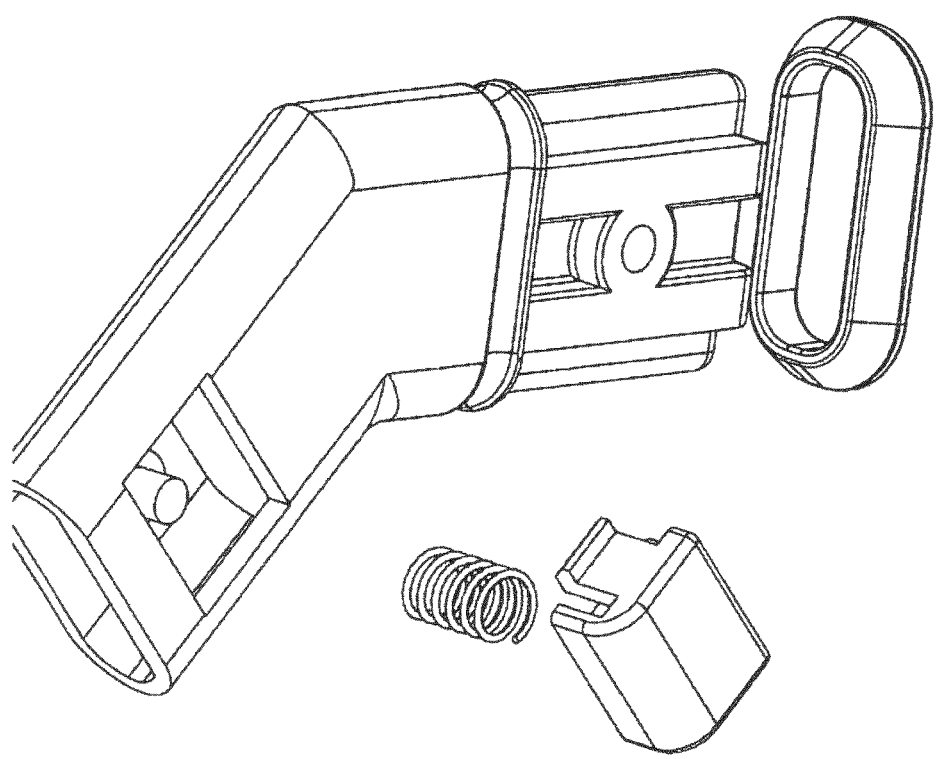
FIG. 3 shows an exploded view of an embodiment of the lock housing.
Figure 4:
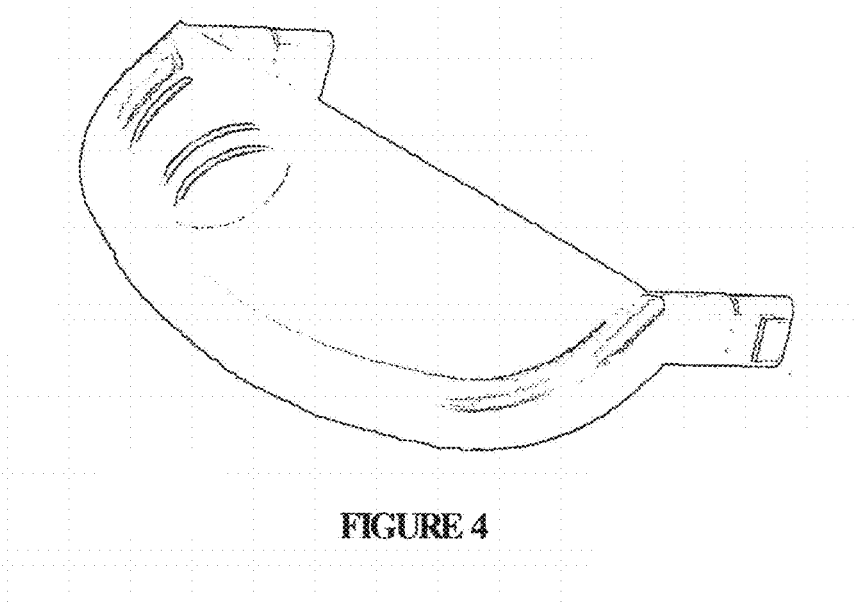
FIG. 4 shows a perspective view of an embodiment of the detachable tray with angled side members.
Figure 5:
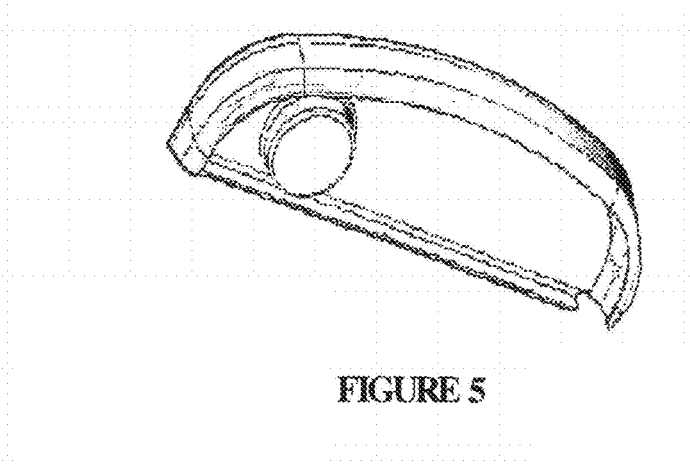
FIG. 5 shows a perspective view of an embodiment of the tray with a sunken receptacle.
Figure 6:
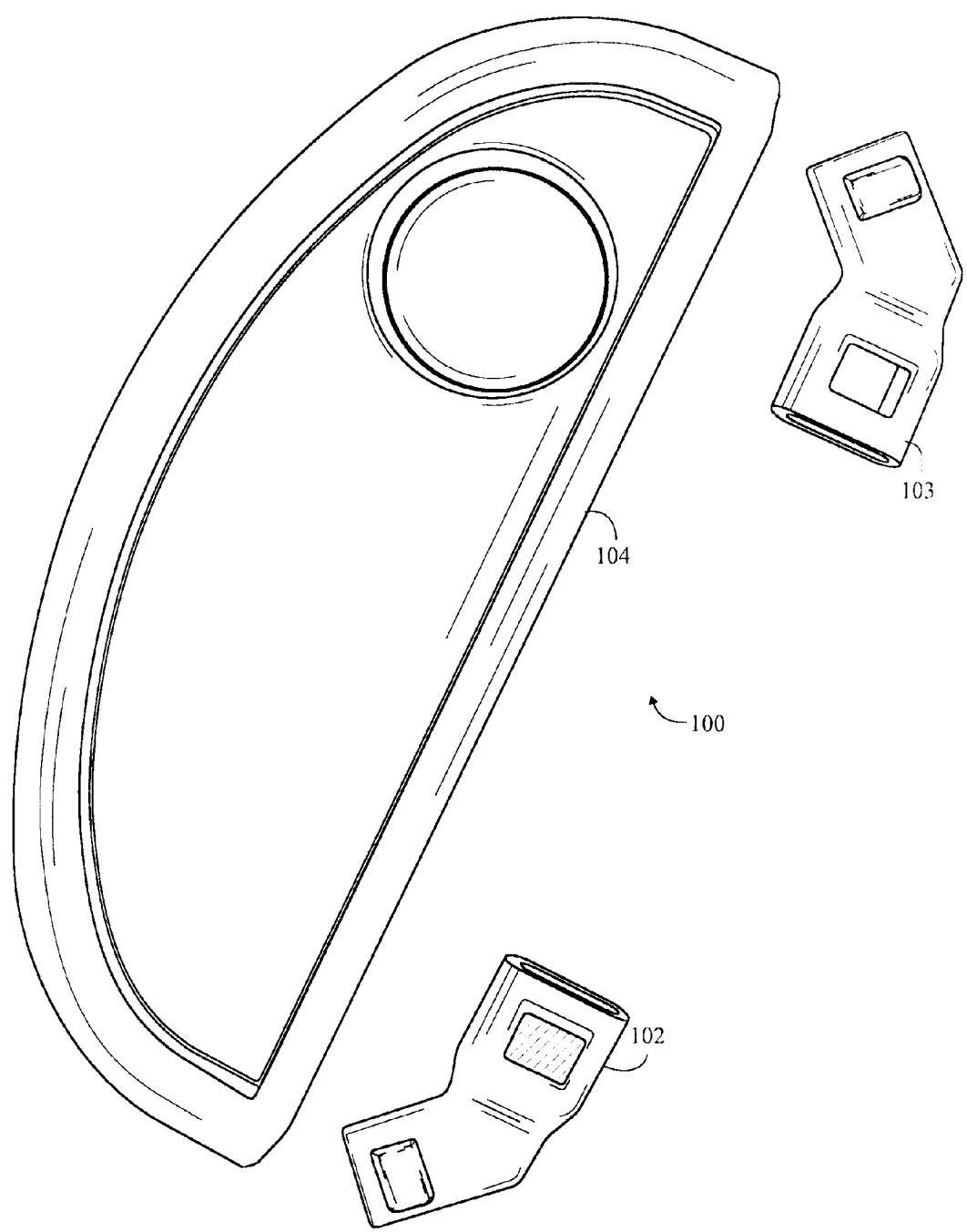
FIG. 6 is a top plan view of an alternative embodiment of a detachable tray accessory of the present invention.

One embodiment of the present invention includes a tray accessory for a stroller which has existing receiving means, such as lock receiver for an accessory, such as a stroller seat handle. The tray accessory of the present invention includes a substantially crescent-shaped support bar. The substantially crescent shaped-support bar is not limited to any particular shape, and it does not have to be crescent in configuration, and may include other shapes such as part of an oval, triangle, square, rectangle, trapezoid, polygons, and other geometric shapes, but what is important is that the support bar extend away from the stroller seat and be able to provide for sufficient and comfortable space between the seated child and the support bar, especially when the support bar and the removable tray are attached to one another. Preferably, the support bar should provide for a space of between about 3 to about 10 inches, and more preferably between about 5 to about 6 inches from the seated child.

The support bar of the present invention may also include a left and a right side member that are connected at one end to the support bar and are angle downward from the plane of the crescent-shaped support bar toward the other opposing end, which attaches to the stroller body or stroller seat depending on the stroller's configuration. This, downward angle of the side members allow for the tray to be held in substantially flat position in front of the child, when the stroller seat is set up at the seating position. Preferably, the left and right side members are angled downward by between about 20 to 60 degrees, and more preferably about 45 degrees from the plane of the substantially crescent-shape support member. The support bar and side member of the present invention can be made of any rigid, flexible, or semi-flexible material that is suitable for this purpose and cab bear the weight of the child's food, drink, toys, and the like. The material can include metals, preferably light-weight metals, plastic, wood, or a combination thereof. The support bar and side members may be unitary or integral and made of one piece of material, or the support bar and the side members may be separate and fixedly attached to each other by any suitable attaching means, such as rivets, screws, nuts and bolt, or the like.

The support bar of the present invention further includes a detachable means at each ends of the support bar, making the support bar removably attachable to a stroller assembly or a stroller seat having means for receiving accessories. Preferably the detachable means are located at the end of the left and the right side members of the present invention. The detachable means may be any means suitable for the purpose of allowing a member to be attached to another member and similarly released, such as quick release and lock mechanisms, snap lock mechanisms, push spring loaded lock buttons, and the like. Preferably, the detachable means include a spring loaded detachable lock button for removably attaching the support bar to a stroller seat having means for receiving accessories. More preferably, the detachable means are included in a lock housing, preferably made of rigid plastic. In some embodiments of the present invention, the side members may not be angled, but they are attached to the lock housing, which provides for the angled configuration, and the side members and the attached lock housing together comprise the side members that are angled downward. Thus, when it is stated that a side member is angled downward, as used throughout this application and the claims, it is included in the definition that a side member is itself angled downwards, or alternatively a side member that is not itself angled downward, but is attached to another member, such as the lock housing which is angled downwards, or a combination of the two. In one embodiment, the side members attach to the lock housing at one end, and the lock housing provides for the angled configuration in its structure, and includes the detachable locking mechanism at the other opposing end. The lock housing may be attached to the side members by any attaching means, preferably a fixedly attaching means, such as rivets, screws, nuts and bolts, or adhesives. Also, the lock housing may further include a raised seal for receiving the side members, preferably made of rubber or other soft material that would not cause discomfort or injuries to the child is the child hands or arms rubs against the seal.

The present invention also includes a substantially flat tray with a central flat area. The tray can be made from any rigid, flexible, or semi-flexible material that is suited for the purpose of a tray, such as light-weight metal, plastic, wood, or a combination thereof. Preferably the tray is made of machine washable plastic. The tray of the present invention preferably includes raised rounded edges, making the tray removably attachable to the support bar by way of the raised rounded edges. The raised round edges preferably have a configuration that is smaller than the support bar, such that the raised round edges of the tray can removably snap onto the support bar and stay in place by the tension provided by the rained round edges gripping the support bar in place. Moreover, the tray of the present invention preferably also includes one or more sunken receptacles for holding a child's items, such as drink holder, plate holder, and toy holder.

Referring to FIG. 1, this example provides an embodiment of a tray accessory for a stroller including a substantially crescent-shaped support bar 101 including a left and a right side members 102 and 103 which angle downward from the plane of the crescent-shaped support bar 101, the left and the right side members 102 and 103 each including a spring loaded detachable lock button 108 for removably attaching the support bar 101 to a stroller seat 107 having means for receiving accessories, the left and the right side members 102 and 103 having a length that provides for sufficient space between a child seated in the stroller seat and the support bar 101. This example of the present invention also includes a substantially flat tray 104 including raised rounded edges, the tray 104 being removably attached to the support bar 101 by way of the raised rounded edges.

In this example of the present invention, the left and the right side members each further include a lock housings 102 and 103 for the spring loaded detachable lock buttons 108. It should be appreciated that in some embodiments, the side member themselves may be angled downward from the plane of the support bar 101, and in other embodiments the side members are not angled, but are attached to the lock housings 102 and 103 by way of a rivet 105, and the lock housings 102 and 103 provide for the angled configuration in their structure such that it is shown in FIG. 1. Furthermore, the lock housings 102 and 103 further include a raised seal 106 for receiving the left and the right side members.

FIGS. 6-10 illustrate an alternative embodiment of a detachable tray accessory 100 of the present invention. In this embodiment, the side connector members 102 and 103 are separate components from the support bar 101 thereby allowing a user 150 to substitute different side members (for height or angle adjustment) or different supports bars 101 to accommodate a tray 104 having a different shape. The side connector members 102 and 103 preferably have a 45 degrees angle. All of the components of the detachable tray accessory 100 are preferably composed of a plastic material. However those skilled in the pertinent art will recognize that other materials such as light-weight metals, wood, or combinations of materials may be used without departing from the scope and the spirit of the present invention.

Figure 8:
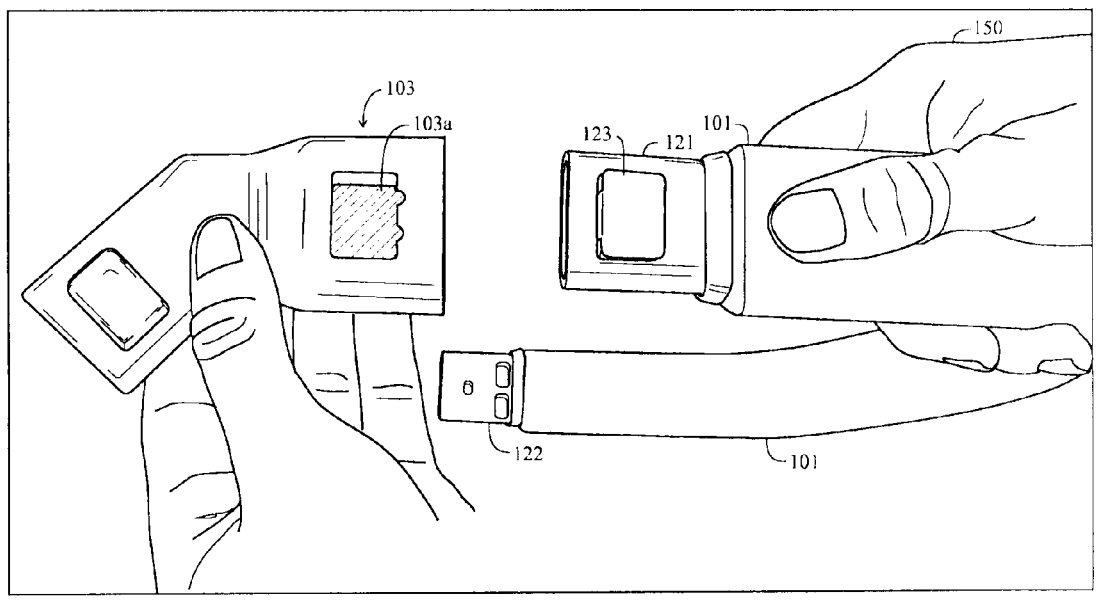
FIG. 8 is an isolated view of a user connecting a support bar of a tray accessory to a side member of the tray accessory.

As shown in FIG. 8, ends 121 and 122 of support bar 101 have a reduced size and a locking button 123 which removably secures with hole 103a of side connector member 103 and hole 102a, not shown, of side connector member 102, also not shown. The support bar 101 preferably has an arc-like shape.

Figure 9:
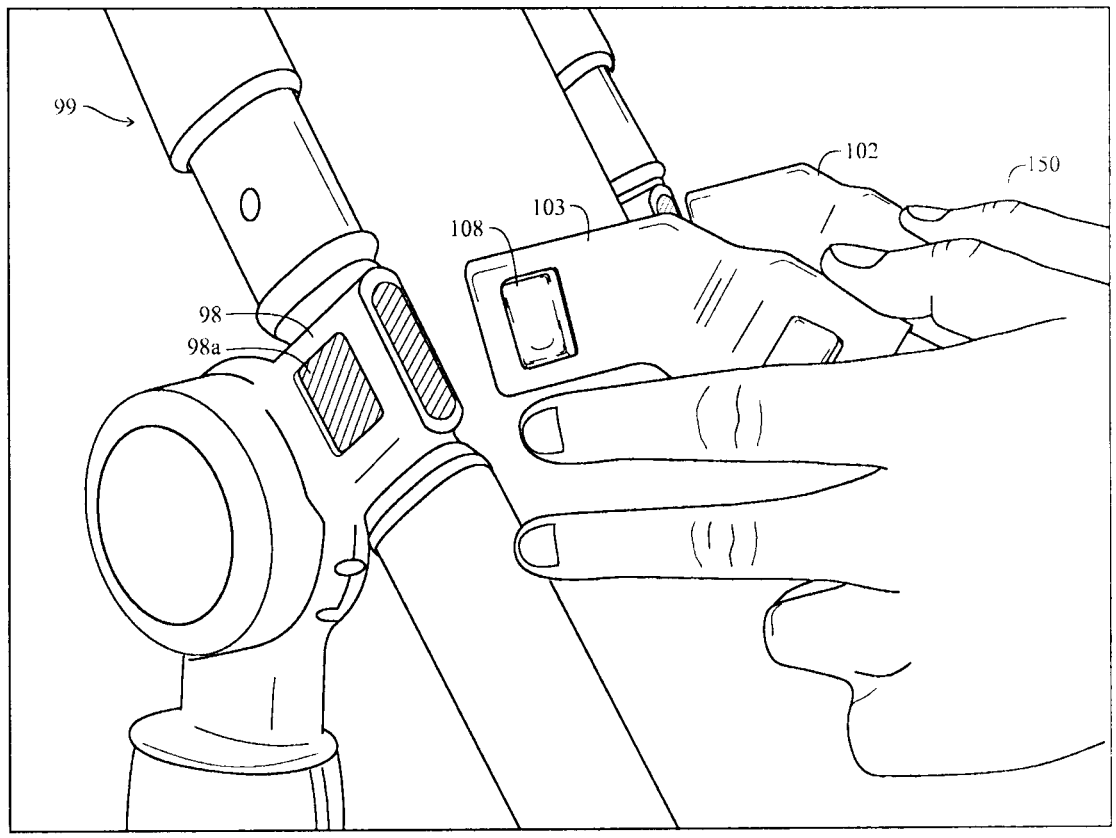
FIG. 9 is an isolated view of a user connecting the side members of the tray accessory to receptors of a stroller.

As shown in FIG. 9, side connector member 103 and side connector member 102 each have a locking button 108 for removably securing to a receptor 98 having a receptor hole 98a in order to removably secure the detachable tray accessory 100 to the stroller 99.

Figure 10:
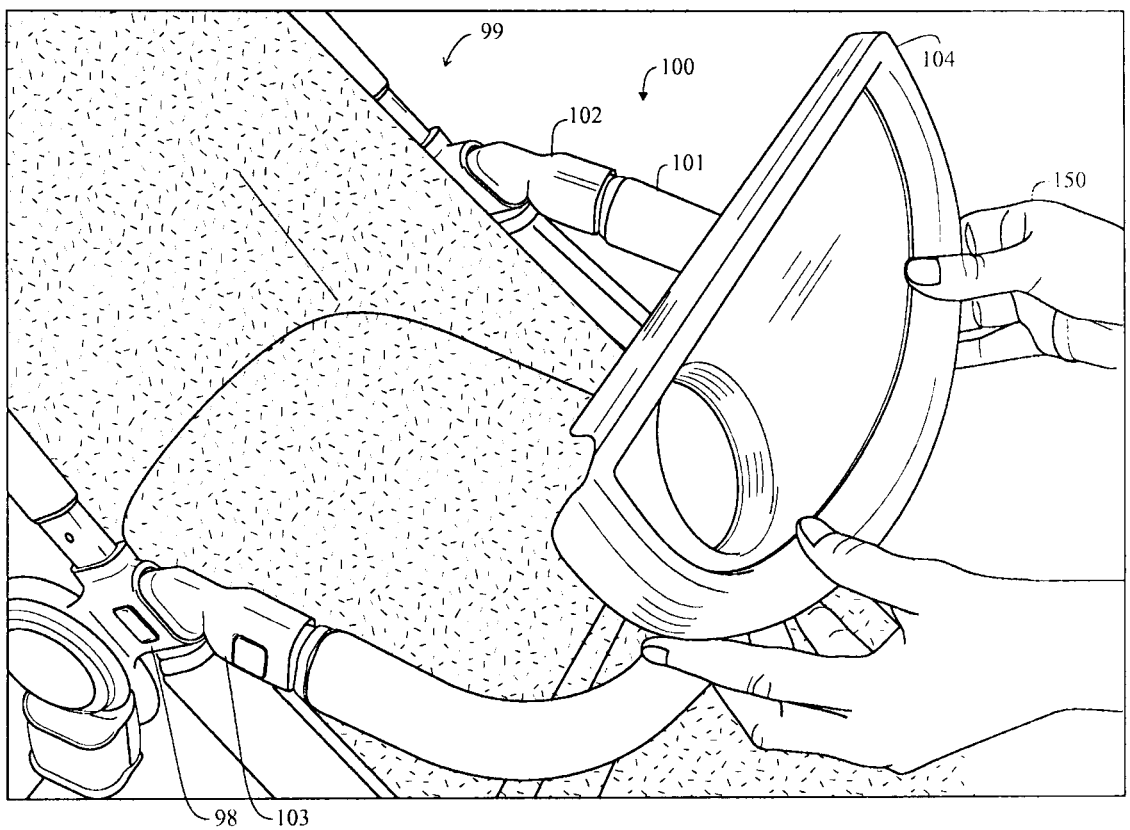
FIG. 10 is an isolated to perspective view of a user placing a detachable tray of a tray accessory on a support bar of a tray accessory that is attached to a stroller.

As shown in FIG. 10, the tray 104 is removably secured to support bar 101, preferably subsequent to securing an infant in a seat of the stroller 99.

Figure 7:
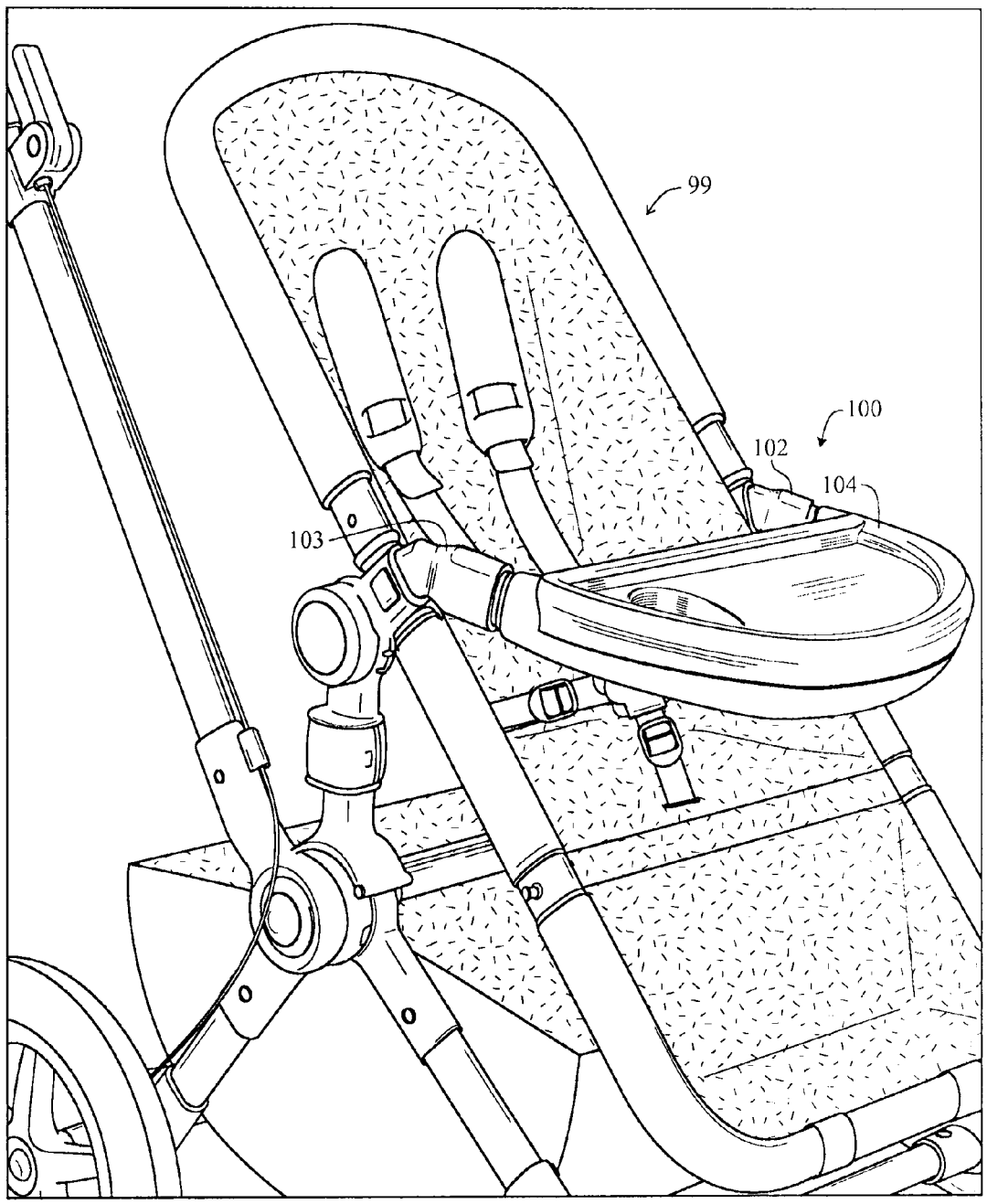
FIG. 7 is a top perspective view of a detachable tray accessory of the present invention attached to a stroller.

As shown in FIG. 7, the detachable tray accessory 100 is removably attached to a stroller 99.

In one specific embodiment, the use of the separate side connector members 102 and 103 allows for a removable carry handle for a stroller to be used as the support bar 101 for the detachable tray accessory 100. In this embodiment, the detachable tray accessory 100 comprises side connector members 102 and 103 and a detachable tray 104, and the detachable tray accessory is used in conjunction with a stroller having removable stroller handle.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim:

1. A detachable tray accessory for a stroller, the detachable tray accessory comprising:

a support bar comprising a rounded extension bar having a first end and a second end, the first end having a locking button and the second end having a locking button;

a first side connector member having a bar end and a stroller end, the first side connector member removably attached at the bar end to the first end of the support bar, and the stroller end is at a downward angle from a top surface of the support bar and comprises a locking button for removable attachment to a stroller having a first receptor for receiving the stroller end of the first side connector member;

a second side connector member removably attached at a bar end to the first end of the support bar and having a stroller end at a downward angle from a top surface of the support bar and comprising a locking button for removable attachment to the stroller having a second receptor for receiving the stroller end of the second side connector member; and a substantially flat tray comprising a curved peripheral raised rounded edge region for covering and attachment to the rounded extension bar of the support bar.

2. The detachable tray accessory of claim 1 wherein the support bar comprises a substantially crescent-shaped configuration.

3. The detachable tray accessory of claim 1 wherein the first and the second side connector members each have a length that provides for sufficient space between a child seated in a stroller seat and the support bar.

4. The detachable tray accessory of claim 1 wherein the first and the second side connector members angle downward from the top surface of the support bar by at least forty-five degrees.

5. The detachable tray accessory of claim 1 wherein the first and the second side connector members each comprise a spring loaded detachable lock button for removably attaching the support bar to a stroller.

6. The detachable tray of claim 1 wherein the substantially flat tray further comprises one or more sunken receptacles for holding a child's items.

7. A detachable tray accessory for a stroller having a removable carry handle having a rounded extension bar having a first end and a second end, the first end having a locking button and the second end having a locking button, the detachable tray accessory comprising:

a first side connector member having a handle end and a stroller end, the first side connector member removably attached at the handle end to the first end of the carry handle, and the stroller end is at a downward angle from a top surface of the handle end and the stroller end comprises a locking button for removable attachment to the stroller having a first receptor for receiving the stroller end of the first side connector member;

a second side connector member having a handle end and a stroller end, the second side connector member removably attached at the handle end to the second end of the carry handle, and the stroller end is at a downward angle from a top surface of the handle end and the stroller end comprises a locking button for removable attachment to a second receptor of the stroller, the second receptor for receiving the stroller end of the second side connector member; and a substantially flat tray comprising a curved peripheral raised rounded edge region for covering and attachment to the rounded extension bar of the carry handle.

8. The detachable tray accessory of claim 7 wherein the first and the second side connector members each have a length that provides for sufficient space between a child seated in a stroller seat and the support bar.

9. The detachable tray accessory of claim 7 wherein the first and the second side connector members angle downward from the plane of the support bar by at least forty-five degrees.

10. The detachable tray accessory of claim 7 wherein the first and the second side connector members each comprise a spring loaded detachable lock button for removably attaching the support bar to a stroller.

11. The detachable tray of claim 7 wherein the substantially flat tray further comprises one or more sunken receptacles for holding a child's items.

12. A detachable tray accessory for a stroller having at least one receptor, the detachable tray accessory comprising:

a support bar comprising a rounded extension bar having a locking button at a connector end of the support bar;

a side connector member having a bar end and a stroller end, the side connector member removably attached at the bar end to the connector end of the support bar, and the stroller end is at a downward angle from a top surface of the support bar and comprises a locking button for removable attachment to the at least one receptor of the stroller which receives the stroller end of the side connector member;

and a substantially flat tray comprising a curved peripheral raised rounded edge region for covering and attachment to the rounded extension bar of the support bar.

* * * * *